Nov. 29, 1960   A. E. RELATION ET AL   2,962,667
ELECTRICAL INVERTER CIRCUITS
Filed Feb. 19, 1958
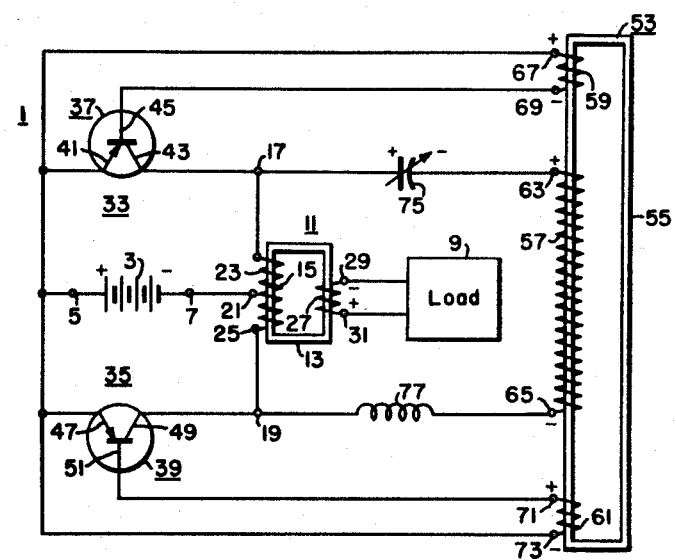

United States Patent Office 2,962,667
Patented Nov. 29, 1960

2,962,667

ELECTRICAL INVERTER CIRCUITS

Alfred E. Relation and John F. Roesel, Jr., Pittsburgh, Pa., assignors to Westinghouse Electric Corporation, East Pittsburgh, Pa., a corporation of Pennsylvania Filed Feb. 19, 1958, Ser. No. 716,164

10 Claims. (Cl. 331—114)

This invention relates to electrical inverter circuits and has particular relation to inverter circuits of the self-excited type and is an improvement of application Serial No. 694,596, filed November 5, 1957 by John F. Roesel, Jr., and Robert W. Lucky and application Serial No. 726,934, filed April 7, 1958, by John F. Roesel, Jr., both of said copending applications being assigned to the same assignee as is this application.

According to the present invention, an electrical inverter circuit of improved construction is provided for producing an alternating output quantity from a direct input quantity having a frequency which is substantially independent of the magnitude of the input quantity and which is variable over a wide range. The frequency of the output quantity is also independent of the magnitude of load devices connected to the inverter circuit. Although the invention has many and varied applications, it will be described in connection with an inverter circuit of the self-excited type.

In the present invention an inverter circuit or oscillator is provided including translating means which may assume a variety of forms. In one form the translating means constitutes a load transformer having magnetic core means connected for magnetization from the direct input quantity through a pair of electrical paths which provide opposing directions of magnetization of the core means. One or more switch devices is included in each of the paths having operating conditions which are transferable in phase opposition relative to each other. The core means may include output winding means for supplying to a suitable load device an alternating output quantity having a rectangular wave pattern with a frequency which is substantially independent of the magnitude of the input quantity and the magnitude of the load device.

In order to control operation of the switch devices the invention provides switch operating means which may include a switching transformer having additional magnetic core means with input winding means linking the additional core means connected for energization from the direct input quantity. The switching transformer further includes biasing winding means linking the additional core means in inductive relation with the input winding means for supplying biasing voltages to the switch devices for controlling operation of the switch devices. The operating conditions of the switch devices depend upon the polarity of the biasing voltagese applied thereto.

The switch operating means includes further control means for controlling energization of the input winding means of the switching transformer. Such control means is effective to periodically reverse the direction of energization of the input winding means of the switching transformer to thereby effect periodic reversal of the polarities of the biasing voltages applied to the switching devices.

In a preferred embodiment of the invention, the control means is in the form of a series resonant network including a condenser and an inductance connected in series relation in the path of energization of the input winding means of the switching transformer. The arrangement is such that operation of the resonant network effects a frequency of reversal of the direction of energization of the input winding means of the switching transformer which is substantially the resonant frequency of the network. This action results in a frequency of reversal of the operating conditions of the switch devices which is also substantially the resonant frequency of the resonant network.

With this arrangement, the frequency of the resulting alternating output quantity is substantially the resonant frequency of the resonant network. Such output frequency is observed to be substantially independent of the magnitude of the direct input quantity and the magnitude of the load device. In the present invention the frequency may be varied over a considerable range by rendering either the condenser or the inductance in the resonant network adjustable to thereby permit variation of the resonant frequency.

In a preferred embodiment of the invention the switch devices are in the form of transistors which are controlled by the biasing potentials derived from the biasing winding means of the switching transformer. It is observed that operation of the resonant network results in the establishment of biasing potentials having sine wave configurations.

It is therefore an object of the invention to provide an electrical inverter circuit of improved construction.

It is another object of the invention to provide a self-excited inverter circuit of improved construction for producing an alternating output quantity from a direct input quantity wherein the output quantity has a frequency substantially independent of the magnitude of the input quantity and the magnitude of a load device energized from the output quantity.

It is a further object of the invention to provide a self-excited inverter circuit for producing an alternating output quantity from a direct input quantity including a pair of switch devices having operating conditions controlled by a switching transformer energized from the input quantity through a series resonant network wherein the frequency of the output quantity is substantially the resonant frequency of the network.

Other objects of the invention will become apparent from the following description taken in conjunction with the accompanying drawing in which the single figure is a circuit diagram illustrating an electrical inverter circuit embodying the teachings of the invention.

Referring to the drawing, there is illustrated in the single figure an electrical inverter circuit represented generally by the numeral 1 embodying the teachings of the present invention. The circuit 1 includes a source of unidirectional voltage which is represented by a battery 3 for providing a unidirectional input quantity which is to be inverted.

The source 3 may comprise any suitable source of unidirectional voltage having either a constant or variable magnitude. The battery 3 is shown as including a positive terminal 5 and a negative terminal 7. A suitable load device schematically represented by the block 9 is shown associated with the circuit 1 for energization in accordance with the alternating output quantity of the circuit.

The circuit 1 includes translating means shown in the form of a transformer 11 having a magnetic core 13 constructed of any suitable magnetic material such as silicon steel. In order to permit magnetization of the core 13 a suitable input winding 15 is provided to link the core 13 having end terminals 17 and 19. The winding 15 is further provided with a center tap connection 21 to divide the winding 15 into two sections 23 and 25.

An output winding 27 is also provided to link the core 13 in inductive relation with the winding 15 for supplying an alternating output quantity to the load device 9. The winding 27 includes output terminals 29 and 31 connected to the load device 9 to permit energization of the load device in accordance with voltage induced in the winding 27 in response to energization of the winding 15.

In order to permit energization of the winding 15 from the source 3 for causing the induction of an alternating output voltage in the winding 27, a pair of electrical paths 33 and 35 is provided to connect respectively the winding sections 23 and 25 for energization from the source 3 to provide opposing directions of magnetization of the core 13. As illustrated in the drawing, the section 23 is included in the path 33 whereas the section 25 is included in the path 35.

For the purpose of controlling energization of the sections 23 and 25 from the source 3 a pair of switch devices 37 and 39 are included respectively in the paths 33 and 35. The devices 37 and 39 may assume any suitable form. For example, the devices 37 and 39 may comprise electroresponsive valve devices such as three electrode vacuum tubes. Preferably, however, the devices 37 and 39 are in the form of three electrode junction transistor devices. Although the transistors 37 and 39 are illustrated in the form of p-n-p transistors, transistors of the n-p-n type may be utilized if desired. As shown in the drawing, the transistor 37 includes an emitter electrode 41, a collector electrode 43 and a base electrode 45. In a similar manner the transistor 39 includes an emitter electrode 47, a collector electrode 49 and a base electrode 51.

In the present invention, the transistors 37 and 39 are biased to operate as controlled switch devices so that each transistor has a closed operating condition wherein the transistor exhibits a very low impedance between the emitter and collector electrodes, and an open operating condition wherein the transistor exhibits a very high impedance between the emitter and collector electrodes. Such impedance conditions may be established by the application of suitable biasing voltages between one of the emitter and collector electrodes and the base electrode of the transistors. Further details of the operation of transistors as controlled switch devices may be found in U.S. Patent 2,783,384 which is assigned to the assignee of the present invention.

As shown in the drawing, the emitter and collector electrodes of the transistors 37 and 39 are included respectively in the paths 33 and 35. To this end the emitter electrode 41 of the transistor 37 is connected to the positive terminal 5 of the source 3. The collector electrode 43 is connected to the terminal 17 of the winding 15 with the center tap connection 21 of the winding 15 connected to the negative terminal 7 of the source 3. In a similar manner the emitter electrode 47 of the transistor 39 is connected to the positive terminal 5 with the collector electrode 49 connected to the terminal 19 of the winding 15.

In order to control operation of the transistors 37 and 39 switch operating means including a switching transformer is provided in accordance with the invention. The switching transformer is represented generally by the numeral 53 and includes a magnetic core 55 which may be constructed of any suitable magnetic material such as silicon steel. In order to effect magnetization of the core 55 a suitable input winding 57 is provided to link the core 55. The core 55 is designed so that it does not saturate within the range of energization of the winding 57. The transformer 53 also includes a pair of biasing windings 59 and 61 which link the core 55 in inductive relation with the winding 57. The winding 57 includes input terminals 63 and 65 which are connected for energization from the source 3 as will appear hereinafter.

In order to supply biasing voltages to the transistors the windings 59 and 61 include output terminals which are connected to electrodes of the transistors. As shown in the drawing, the winding 59 includes output terminals 67 and 69 which are connected respectively to the emitter electrode 41 and the base electrode 45 of the transistor 37. In a similar manner the winding 61 includes output terminals 71 and 73 which are connected respectively to the base electrode 51 and the emitter electrode 47 of the transistor 39. As will appear hereinafter, such connections permit the application of biasing voltages induced in the windings 59 and 61 in response to energization of the winding 57 to the transistors for establishing opposing operating conditions of the transistors. The operating condition of each transistor is determined by the polarity of the voltage applied thereto from the windings 59 and 61. Consequently, if the polarities of such applied voltages are reversed periodically the operating conditions of the transistors may be correspondingly periodically reversed.

In order to control energization of the winding 57 for effecting periodic reversals of the voltages applied by the windings 59 and 61, the invention provides control means illustrated in the form of a series resonant network which is connected in the path of energization of the winding 57. As shown in the drawing, the resonant network includes a condenser 75 and an inductance 77 which are connected in series with the winding 57. This series circuit is connected in parallel circuit relation with the winding 15.

The operation of the circuit 1 may now be described. When the source 3 is connected in the circuit 1, it has been observed that one of the transistors 37 and 39 will eventually assume a current conducting condition. For purposes of discussion, it will be assumed that the transistor 37 is initially in a conducting condition and that the transistor 39 is in a non-conducting condition.

For this condition then a substantial portion of current from the source 3 flows from the positive terminal 5 through the emitter electrode 41, the collector electrode 43 and the winding section 23 back to the negative terminal 7 of the source 3. Such current flow through the winding section 23 establishes a magnetomotive force which directs magnetic flux through the core 13 effective to induce a voltage in the winding 27 having a polarity as indicated by the associated plus and minus signs.

At the same time a portion of current from the source 3 also flows from the positive terminal 5 of the battery 3 through the emitter electrode 41, the collector electrode 43, the condenser 75, the winding 57, the inductance 77 and the winding section 25 back to the negative terminal 7. This current flow through the winding 57 is effective to induce voltages in the windings 57, 59 and 61 having polarities as indicated by the associated plus and minus signs. The voltages so induced in the windings 59 and 61 have polarities such that the transistor 37 is maintained in a conducting condition and the transistor 39 is maintained in a non-conducting condition.

After the elapse of a preselected time determined by the resonant frequency of the resonant network the condenser 75 will be substantially fully charged with the polarity shown with the result that current flowing through the winding 57 drops to substantially a zero value. Such current drop results in a corresponding drop in the magnitudes of voltages induced in the windings 57, 59 and 61 to substantially zero values. This voltage reduction causes the transistor 37 to approach a non-conducting condition with the result that the voltage across the terminals 17 and 19 decreases to a value less than the magnitude of voltage across the condenser 75.

When this situation occurs the condenser 75 is discharged through a path which may be traced from the positive side of the condenser to the terminal 17, the winding 15, the terminal 19, the inductance 77 and the winding 57 back to the negative side of the condenser. The discharge current flowing through this path effects energization of the winding 57 in a direction which is opposite to the direction of energization of the winding 57 when the transistor 37 is in a conductive condition. As a result of this, a magnetomotive force is established which directs magnetic flux through the core 55 in a direction which is opposite to the direction of flux flow resulting when the transistor 37 is in a conductive condition. The establishment of this flux flow results in the induction of voltages in the windings 57, 59 and 61 having polarities opposite to those illustrated. Consequently, the transistor 37 is now in a non-conducting condition whereas the transistor 39 assumes a conducting condition.

These conditions continue for one-half cycle of the resonant frequency at which time the condenser 75 is charged with a polarity opposite to that shown and current through the winding 57 is reduced to a zero value. When this occurs transistor 39 begins to assume a non-conducting condition and condenser 75 discharges through a path which may be traced from the condenser 75, terminal 63, the winding 57, the inductance 77 and the winding 15 back to the condenser 75. This discharge current results in the establishment of a conducting condition of the transistor 37 and a non-conducting condition of transistor 39.

The preceding conditions of the transistors 37 and 39 are maintained for one-half cycle of the resonant frequency of the resonant network at which time the condenser 75 is again charged with the polarity illustrated. When this occurs current through winding 57 is at a zero value which initiates transfer of transistor 37 to a non-conducting condition.

The cycle of events above described is repeated by continued operation of the resonant network. It is observed that voltages of sine wave configuration are induced in the windings 59 and 61. If desired these voltages may be caused to have substantially rectangular wave patterns by connecting one or more additional resonant networks in parallel with the network shown which are tuned to harmonics of the fundamental frequency of the illustrated network.

The arrangement is such that the paths 33 and 35 are alternately in conductive and non-conductive conditions with the result that an alternating voltage is induced in the winding 27 having a rectangular wave pattern with a frequency which is substantially the resonant frequency of the resonant network. It has been observed that the frequency of the alternating output quantity appearing across the terminals 29 and 31 is substantially independent of the magnitude of the load device 9. The frequency of the alternating output voltage may be varied by rendering either the condenser 75 or the inductance 77 adjustable. This arrangement permits an adjustment of the resonant frequency of the resonant network to thereby permit a variation of the frequency of the output quantity.

The substantially constant frequency characteristics of the circuit 1 as well as the ability to readily change the frequency over a substantial range provides advantages in many applications. Another advantage of the circuit 1 is that the employment of expensive saturating magnetic cores heretofore utilized to effect the switching functions is not required.

Although the invention has been described with reference to certain specific embodiments thereof, numerous modifications are possible and it is desired to cover all modifications falling within the spirit and scope of the invention.

We claim as our invention:

1. In an electrical system, a source of unidirectional voltage, a pair of output terminals adapted to be connected to a load, a pair of electrical paths connected between said source and said terminals for supplying energizing currents from said source to said terminals in opposing directions, switch means included in each of said paths, each of said switch means being operable to transfer the path with which it is associated between a conductive condition and a non-conductive condition, switch operating means including electromagnetic means for controlling the operation of both said switch means, said electromagnetic means having input winding means connected for energization by a voltage proportional to that supplied to said terminals, said input winding means being connected for energization in a first direction during a conductive condition of one of said paths while the other of said paths is in a non-conductive condition, said input winding means being further connected for energization in a second direction opposite to said first direction during a conductive condition of said other of said paths while said one of said paths is in a non-conductive condition, said input winding means being effective when energized in said first direction to operate said switch means for maintaining said first-named conditions, and when energized in said second direction to operate said switch means for maintaining said last-named conditions, and control means for controlling energization of said input winding means, said control means comprising a series resonant network connected in series relation with said input winding means for energization from said source, said resonant network operating to reverse the direction of energization of said input winding means and the direction of energization of said terminals with a frequency which is substantially the resonant frequency of said resonant network.

2. In an electrical system, a source of unidirectional voltage, a pair of load supplying terminals, a pair of electrical paths connected to supply energizing currents derived from said source to said terminals in opposing directions, switch means included in each of said paths, each of said switch means being operable to transfer the associated path between a conductive condition and a non-conductive condition, switch operating means including electromagnetic means for controlling operation of said switch means, said electromagnetic means having input winding means connected to be energized with a voltage proportional to the voltage across said terminals, said input winding means being connected for energization in a first direction during a conductive condition of one of said paths while the other of said paths is in a non-conductive condition, said input winding means being further connected for energization in a second direction opposite to said first direction during a conductive condition of said other of said paths while said one of said paths is in a non-conductive condition, said input winding means being effective when energized in said first direction to operate said switch means for maintaining said first-named conditions, and when energized in said second direction to operate said switch means for maintaining said last-named conditions, and control means for periodically reversing the direction of energization of said input winding means, said control means comprising a series resonant network including a condenser and an inductance connected in series relation with said input winding means.

3. In an electrical system, a source of direct voltage, a pair of output terminals adapted to be connected to a load, a pair of electrical paths connected to supply energizing currents derived from said source to said terminals in opposing directions, a pair of electroresponsive valve devices each having a main circuit and a control circuit, said main circuit of a first of said devices being included in one of said paths, said main circuit of the other of said devices being included in the other of said paths, each of said devices being operable to transfer said path with which it is associated between a conductive condition and a non-conductive condition, a magnetic core, an input winding linking the core, means connecting said input winding to said paths for energization with a voltage proportional to that supplied to said terminals for energization in a first direction during a conductive condition of one of said paths while the other of said paths is in a non-conductive condition and in a second direction opposite to said first direction during a conductive condition of said other path while said one path is in a non-conductive condition, a pair of biasing windings linking the core in inductive relation with said input winding, each of said biasing windings being connected to said control circuit of a separate one of said devices, said biasing windings being connected to apply voltages induced therein by energization of said input winding in said first direction to operate said devices for maintaining a conductive condition of said one path and a non-conductive condition of said other path and to apply voltages induced therein by energization of said input winding in said second direction to operate said devices for maintaining a conductive condition of said other path and a non-conductive condition of said one path, and control means for periodically reversing the direction of energization of said input winding, said control means comprising a series resonant network connected in series relation with said input winding for energization from said source, the direction of energization of said terminals thereby reversing with a frequency which is substantially the resonant frequency of said resonant network.

4. In an electrical system, a source of direct voltage, a pair of load supplying terminals, a pair of electrical paths connected to supply energizing currents derived from said source to said terminals in opposing directions, a pair of transistor devices each having a main circuit and a control circuit, said main circuit of a first of said devices being included in one of said paths, said main electrodes of the other of said devices being included in the other of said paths, each of said devices being operable to transfer the path with which it is associated between a conductive condition and a non-conductive condition, a magnetic core, an input winding linking the core, said input winding being connected to said paths for energization with a voltage proportional to that supplied to said terminals for energization in a first direction during a conductive condition of one of said paths while the other of said paths is in a non-conductive condition, and for energization in a second direction opposite to said first direction during a conductive condition of said other path while said one path is in a non-conductive condition, a pair of biasing windings linking the core in inductive relation with said input winding, each of said biasing windings being connected to said control circuits of a separate one of said devices, said biasing windings being connected to apply voltages induced therein by energization of said input winding in said first direction to operate said devices for establishing a conductive condition of said one path and a non-conductive condition of said other path, and to apply voltages induced therein by energization of said input winding in said second direction to operate said devices for establishing a conductive condition of said other path and a non-conductive condition of said one path, and control means for periodically reversing the direction of energization of said input winding, said control means comprising a series resonant network including a condenser and an inductance connected in series relation with said input winding.

5. In an electrical system, a source of direct voltage, a pair of load supplying terminals, a pair of electrical paths connected to supply energizing currents derived from said source to said terminals in opposing directions, a pair of electroresponsive valve devices each having a main circuit and a control circuit controlling current flow through said main circuit, said main circuit of one of said devices being included in one of said paths, said main circuit of the other of said devices being included in the other of said paths, each of said devices being operable to transfer the path with which it is associated between a conductive condition and a non-conductive condition, a magnetic core, an input winding linking the core, said input winding being connected in said paths to be energized with a potential proportional to that at said terminals for energization in a first direction during a conductive condition of one of said paths while the other of said paths is in a non-conductive condition, and for energization in a second direction opposite to said first direction during a conductive condition of said other path while said one path is in a non-conductive condition, a pair of biasing windings linking the core in inductive relation with said input winding, each of said biasing windings being connected across said control circuit of a separate one of said devices, said biasing windings being connected to apply voltages induced therein by energization of said input winding in said first direction to operate said devices for establishing a conductive condition of said one path and a non-conductive condition of said other path, and to apply voltages induced therein by energization of said input winding in said second direction to operate said devices for establishing a conductive condition of said other path and a non-conductive condition of said one path, and control means for periodically reversing the direction of energization of said input winding, said control means comprising a series resonant network including a condenser and an inductance connected in series relation with said input winding, the direction of energization of said terminals thereby reversing with a frequency which is substantially the resonant frequency of said resonant network, at least one said condenser and said inductance being adjustable to permit a variation of said resonant frequency to thereby permit a change in the frequency of reversal of the direction of energization of said terminals.

6. In an electrical system, a source of direct voltage, a pair of output terminals, a load device connected to said terminals, a pair of electrical paths connected to supply energizing currents derived from said source to said terminals and to said load device in opposing directions, a pair of transistor devices each having a main current circuit and a control circuit, said main circuit of one of said devices being included in one of said paths, said main circuit of the others of said devices being included in the other of said paths, each of said devices being operable to transfer the path with which it is associated between a conductive condition and a non-conductive condition, a magnetic core, an input winding linking the core, said input winding being connected to said paths for energization by a potential proportional to that supplied to said terminals for energization in a first direction during a conductive condition of one of said paths while the other of said paths is in a non-conductive condition, and for energization in a second direction opposite to said first direction during a conductive condition of said other path while said one path is in a non-conductive condition, a pair of biasing windings linking the core in inductive relation with said input winding, each of said biasing windings being connected to said control circuit of a separate one of said devices, said biasing windings being connected to apply voltages induced therein by energization of said input winding in said first direction to operate said devices for establishing a conductive condition of said one path and a non-conductive condition of said other path, and to apply voltages induced therein by energization of said input winding in said second direction to operate said devices for establishing a conductive condition of said other path and non-conductive condition of said one path, and control means for controlling the direction of energization of said input winding, said control means comprising a series resonant network the current flow of which is independent of the current flow to said load device, said network including a condenser and an inductance connected in series relation with said input winding.

7. In an electrical system, a source of direct voltage, a transformer including a first magnetic core, and primary and secondary windings linking said first core in inductive relation, said primary winding having a pair of winding sections; a pair of electrical paths each including a separate one of said winding sections connected for energization from said source to supply energizing currents to said sections to induce flux in said core in opposing directions, a pair of electroresponsive valve devices each having a main current circuit and a control current circuit, said main circuit of one of said devices being included in one of said paths, said main circuit of the other of said devices being included in the other of said paths, each of said devices being operable to transfer the path with which it is associated between a conductive condition and a non-conductive condition, a second magnetic core, an input winding linking the second core, said input winding being connected in parallel relation with said primary winding for energization in a first direction during a conductive condition of one of said paths while the other of said paths is in a non-conductive condition, and for energization in a second direction opposite to said first direction during a conductive condition of said other path while said one path is in a non-conductive condition, a pair of biasing windings linking the second core in inductive relation with said input winding, each of said biasing windings being connected to said control circuit of a separate one of said devices, said biasing windings being connected to apply voltages induced therein by energization of said input winding in said first direction to operate said devices for establishing a conductive condition of said one path and a non-conductive condition of said other path, and to apply voltages induced therein by energization of said input winding in said second direction to operate said devices for establishing a conductive condition of said other path and a non-conductive condition of said one path, and control means for controlling energization of said input winding, said control means comprising a series resonant network connected in series relation with said input winding, said secondary winding having an alternating voltage induced therein with a frequency which is substantially the resonant frequency of said resonant network and being adapted to be connected to a pair of load supplying terminals.

8. In an electrical system, a source of direct voltage, a transformer including a first magnetic core, and primary and secondary windings linking said first core in inductive relation, said primary winding having a pair of winding sections, a pair of electrical paths each including a separate one of said winding sections connected for energization from said source to supply energizing currents in said sections to induce flux in said core in opposing directions, a pair of electroresponsive valve devices each having a main circuit and a control circuit, said main circuit of one of said devices being included in one of said paths, said main circuit of the other of said devices being included in the other of said paths, each of said devices being operable to transfer the path with which it is associated between a conductive condition and a non-conductive condition, a second magnetic core, an input winding linking the second core, said input winding being connected in parallel relation with said primary winding for energization from said source in a first direction during a conductive condition of one of said paths while the other of said paths is in a non-conductive condition, and for energization in a second direction opposite to said first direction during a conductive condition of said other path while said one path is in a non-conductive condition, a pair of biasing windings linking the second core in inductive relation with said input winding, each of said biasing windings being connected to said control circuit of a separate one of said devices, said biasing windings being connected to apply voltages induced therein by energization of said input winding in said first direction to operate said devices for establishing a conductive condition of said one path and a non-conductive condition of said other path, and to apply voltages induced therein by energization of said input winding in said second direction to operate said devices for establishing a conductive condition of said other path and a non-conductive condition of said one path, and control means for controlling energization of said input winding, said control means comprising a series resonant network including a condenser and an inductance connected in series relation with said input winding, said secondary winding having alternating voltage induced therein with a frequency which is substantially the resonant frequency of said resonant network and being adapted to be connected to a pair of load supplying terminals, at least one of said condenser and said inductance being adjustable to permit a variation of said resonant frequency to thereby permit a change in the frequency of said alternating voltage.

9. In an electrical system, a source of direct voltage, a transformer including a first magnetic core, and primary and secondary windings linking said first core in inductive relation, said primary winding having a pair of winding sections; a pair of electrical paths each including a separate one of said winding sections connected for energization from said source to supply energizing currents to said sections for energizing said core in opposing directions, a pair of transistor devices each having a main circuit and a control circuit, said main circuit of one of said devices being included in one of said paths, said main circuit of the other of said devices being included in the other of said paths, each of said devices being operable to transfer the path with which it is associated between a conductive condition and a non-conductive condition, a second magnetic core, an input winding linking the second core, said input winding being connected in parallel relation with said primary winding for energization from said source in a first direction during a conductive condition of one of said paths while the other of said paths is in a non-conductive condition, and for energization in a second direction opposite to said first direction during a conductive condition of said other path while said one path is in a non-conductive condition, a pair of biasing windings linking the second core in inductive relation with said input winding, each of said biasing windings being connected to said control circuit of a separate one of said devices, said biasing windings being connected to apply voltages induced therein by energization of said input winding in said first direction to operate said devices for establishing a conductive condition of said one path and a non-conductive condition of said other path, and to apply voltages induced therein by energization of said input winding in said second direction to operate said devices for establishing a conductive condition of said other path and a non-conductive condition of said one path, and control means for controlling energization of said input winding, said control means comprising a series resonant network including a condenser and an inductance connected in series relation with said input winding, said secondary winding having an alternating voltage induced therein with a frequency which is susbtantially the resonant frequency of said resonant network and being adapted to be connected to a pair of load supplying terminals, at least one of said condenser and inductance being adjustable to permit a variation of said resonant frequency to thereby permit a change in the frequency of said alternating voltage.

10. In an electrical system, a source of direct voltage, a transformer including a first magnetic core, and primary and secondary windings linking said first core in inductive relation, said primary winding having a pair of winding sections; a pair of electrical paths each including a separate one of said winding sections connected for energization from said source to supply energizing currents to said sections for energizing said core in opposing directions, a pair of transistor devices each having a main circuit and a control circuit, said main circuit of one of said devices being included in one of said paths, said main circuit of the other of said devices being included in the other of said paths, each of said devices being operable to transfer the path with which it is associated between a conductive condition and a non-conductive condition, a second magnetic core, an input winding linking the second core, said input winding being connected in parallel relation with said primary winding for energization from said source in a first direction during a conductive condition of one of said paths while the other of said paths is in a non-conductive condition, and for energization in a second direction opposite to said first direction during a conductive condition of said other path while said one path is in a non-conductive condition, a pair of biasing windings linking the second core in inductive relation with said input winding, each of said biasing windings being connected to said control circuit of a separate one of said devices, said biasing windings being connected to apply voltages induced therein by energization of said input winding in said first direction to operate said devices for establishing a conductive condition of said one path and a non-conductive condition of said other path, and to apply voltages induced therein by energization of said input winding in said second direction to operate said devices for establishing a conductive condition of said other path and a non-conductive condition of said one path, control means for controlling energization of said input winding, said control means comprising a series resonant network connected in series relation with said input winding, said secondary winding having alternating voltage induced therein with a frequency which is substantially the resonant frequency of said resonant network and being adapted to be connected to a pair of load supplying terminals, and a load device connected to said secondary winding for energization in accordance with said alternating voltage.

References Cited in the file of this patent

UNITED STATES PATENTS

| | | |
|---|---|---|
| 1,754,749 | Gerth | Apr. 15, 1930 |
| 2,698,386 | Eberhard et al. | Dec. 28, 1954 |
| 2,782,309 | Aasma | Feb. 19, 1957 |
| 2,783,384 | Bright et al. | Feb. 26, 1957 |
| 2,849,614 | Royer et al. | Aug. 26, 1958 |
| 2,883,539 | Bruck et al. | Apr. 21, 1959 |